United States Patent Office 3,032,565
Patented May 1, 1962

3,032,565
PROCESS FOR THE MANUFACTURE OF 6-ALK-
OXY- AND 6-KETO STEROIDS AND COMPOUNDS
OBTAINED THEREBY
Raymond M. Dodson, Park Ridge, and Paul B. Sollman, Wilmette, Ill., assignors to G. D. Searle & Co., Chicago, Ill., a corporation of Delaware
No Drawing. Filed Aug. 24, 1960, Ser. No. 51,518
9 Claims. (Cl. 260—397.4)

The present invention relates to a novel process for the manufacture of 6-alkoxy- and 6-keto-steroids, which can be represented by the structural formulae

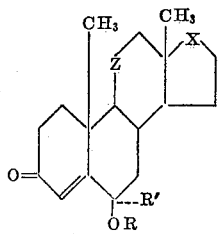

and

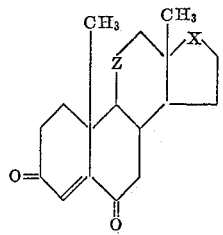

in which R is a lower alkyl radical, R' is hydrogen or a methyl radical, Z is a methylene, hydroxymethylene, or carbonyl radical, and X is a carbonyl,

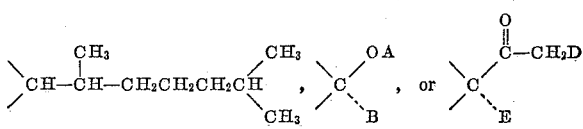

radical, in which groups A is hydrogen or a lower alkanoyl radical, B is hydrogen, a lower alkyl, or a lower alkynyl radical, and D and E are members of the class comprising hydrogen, hydroxy, and (lower alkanoyl)oxy radicals.

Also within the scope of this invention are novel 6-alkoxy compounds of the structural formulae

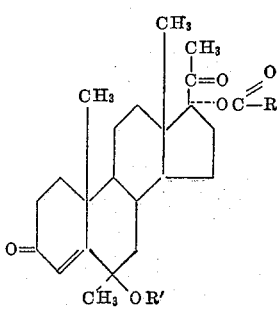

and

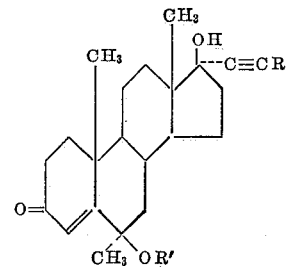

wherein R is hydrogen or a lower alkyl radical and R' is a lower alkyl radical. These substances are useful as potent progestational agents, which lack the pronounced side-effects characteristic of prior art compositions adapted for that purpose.

The lower alkyl radicals represented in the structural formulae supra are exemplified by methyl, ethyl, propyl, butyl, pentyl, hexyl, and the branched-chain isomers thereof. Lower alkanoyl radicals are, typically, formyl, acetyl, propionyl, butyryl, valeryl, caproyl, and their branched-chain isomers, said groups being the acyl radicals of alkanoic acids containing fewer than 7 carbon atoms. Examples of lower alkynyl radicals represented supra are ethynyl, propynyl, butynyl, pentynyl, hexynyl, and their branched-chain isomers.

The instant process when applied to preparation of the compounds of structural formula

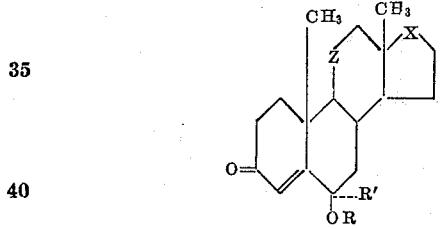

wherein R, R', X and Z are as defined supra, involves treatment of a compound of the structural formula

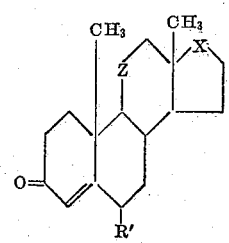

with a lower alkanol such as methanol or ethanol together with a cupric halide, wherein the halide can be either chloride or bromide. In the preferred embodiment of this process, 2 molecular equivalents of the cupric halide are used. As will be apparent from the discussion hereinafter, utilization of excess cupric halide leads to further reaction of the molecule. The reaction temperature may be between 0 and 100°, and the reaction time may vary from 30 minutes to 7 days. Although no catalyst is required, organic bases such as pyridine, triethylamine, etc., which can act as acid acceptors, may be included in the reaction mixture for the purpose of inhibiting the aforementioned further reaction of the 6-alkoxy product, and also to minimize possible degradation or rearrangement of sensitive side-chains.

It will be apparent to those skilled in the art that higher reaction temperatures will permit a decrease in the time necessary to complete the instant process. It has been determined also that higher temperatures and/or longer times are permissible when an acid acceptor is used. Examples of alternative optimum conditions are as follows:

(1) Heat at the reflux temperature for 1–2 hours in the presence of an acid acceptor.

(2) Allow to react at 25–30° for 1–3 days in the presence of an acid acceptor.

(3) Allow to react at 0–5° for 1–3 days with *no* acid acceptor included.

(4) Allow to react at 25–30° for 30 minutes–2 hours *without* an acid acceptor present.

6-alkoxy compounds represented supra can be converted to 3,6-diones, which are useful pharmacological agents. Specific examples involve heating a dioxane solution of 17β-hydroxy-6β-methoxyandrost-4-en-3-one, 6β-methoxypregn-4-ene-3,20-dione, 6β-methoxycholest-4-en-3-one, or 21-hydroxy-6β-methoxypregn-4-ene-3,20-dione with dilute hydrochloric acid to produce 17β-hydroxy-5α-androstane-3,6-dione, 5α-pregnane-3,6,20-trione, cholestane-3,6-dione, and 21-hydroxy-5α-pregnane-3,6,20-trione. The aforementioned 17β-hydroxy-5α-androstane-3,6-dione, for example, possesses anabolic and adrenocorticotropic activity while cholestane-3,6-dione is a cardiac stimulant.

The instant process, as disclosed supra, is useful for the production of a potent anti-inflammatory agents, exemplified by 17α,21-dihydroxy-6β-methoxypregn-4-ene-3,11,20-trione, which was invented by Dr. Roy H. Bible.

When the instant process is carried out with greater than 2 molecular equivalents of the cupric halide in the absence of an acid acceptor, the product is a 6-dehydro-6-alkoxy compound, as shown below:

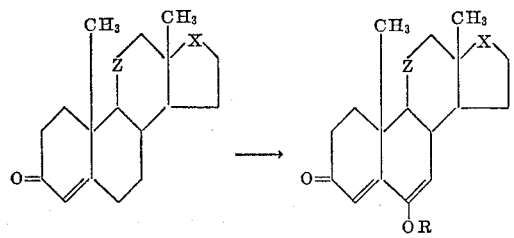

wherein R, X, and Z are as defined supra.

Optimally, 4 molecular equivalents of the cupric halide are utilized to achieve the best yields of this product. The same time and temperature variables as discussed supra apply to the application of the instant process to the manufacture of these 6-dehydro-6-alkoxy compounds. A specific example of this application involves treatment of 17β-hydroxyandrost-4-en-3-one with 4 molecular equivalents of cupric bromide in methanol solution to produce 17β-hydroxy-6-methoxyandrosta-4,6-dien-3-one. Likewise, 17α-acetoxypregn-4-ene-3,20-dione is converted to 17α-acetoxy-6-methoxypregna-4,6-diene-3,20-dione.

The instant 6-dehydro-6-alkoxy compounds are useful as intermediates to the corresponding 6-keto compounds. This conversion involves reaction of the unsaturated alkoxy compound with dilute hydrochloric acid in a suitable solvent such as dioxane. Typically, 17β-acetoxy-6-methoxyandrosta-4,6-dien-3-one is treated with dilute hydrochloric acid in dioxane to yield 17β-acetoxyandrost-4-ene-3,6-dione. These 6-keto compounds are pharmacologically active substances and are useful also as intermediates to the corresponding 6-methyl-6-dehydro compounds. For example, androst-4-ene-3,6,17-trione, 17β-hydroxyandrost-4-ene-3,6-dione, and pregn-4-ene-3,6,20-trione are estrogenic agents, while cholest-4-ene-3,6-dione is a cardiac stimulant. Conversion of these 6-keto compounds to the 6-methyl-6-dehydro substances involves first, protection of the 3-keto function by an ethylenedithio group, then reaction with methyl magnesium bromide followed by hydrolysis with mineral acid, and finally dehydration and cleavage of the 3-thioketal. 17α-acetoxypregn-4-ene-3,6,20-trione, for instance, is treated first with ethylenedithiol then with the aforementioned methyl Grignard reagent and hydrolyzed with hydrochloric acid to afford 17α-acetoxy-6-hydroxy-6-methylpregn-4-ene-3,20-dione 3-ethylene thioketal. Reaction of the latter substance with aqueous hydrochloric acid and cadmium chloride in ethanol yields 17α-acetoxy-6-methylpregna-4,6-diene-3,20-dione, a known potent progestational agent.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given degrees centigrade (° C.). Quantities of materials are expressed in parts by weight unless otherwise noted.

EXAMPLE 1

*Method A*

A mixture of 14.32 parts of androst-4-ene-3,17-dione, 22.34 parts of cupric bromide, 7.9 parts of pyridine, and 200 parts of methanol is heated at reflux for about 35 minutes, cooled, and poured into approximately 1500 parts of water. The resulting precipitate is collected by filtration, dried, and extracted with ethyl acetate. Concentration of the extract affords an oil, which is crystalized first from ether, then from acetone-hexane to yield 6β-methoxyandrost-4-ene-3,17-dione, M.P. about 164–166°. It exhibits an unltraviolet maximum at about 233.5 millimicrons with a molecular extinction coeffcient of about 13,100.

*Method B*

A mixture of 2.86 parts of androst-4-ene-3,17-dione, 4.47 parts of cupric bromide, and 160 parts of methanol is stored at about 5° for about 7 days. Dilution of the reaction mixture with several volumes of water results in precipitation of the product, which is collected by filtration and recrystallized from aqueous methanol to afford 6β-methoxyandrost-4-ene-3,17-dione, M.P. about 157–159°; $[\alpha]_D = +122°$ (chloroform). It exhibits infrared maxima at about 5.73, 5.92, 6.18, 9.20, and 11.38 microns, and is identical with the compound obtained by Method A supra.

EXAMPLE 2

A mixture of 7.2 parts of pregn-4-ene-3,20-dione, 10.1 parts of cupric bromide, and 200 parts of ethanol is stirred at room temperature for about 30 minutes, then poured into about 900 parts of water. The resulting mixture is extracted with ether, and the organic layer is dried over sodium sulfate, then concentrated to an oil, which crystalizes on standing. A solution of this crystalline material in benzene is chromatographed on silica gel. Elution of the column with 10% ethyl acetate in benzene followed by crystallization from acetone-hexane affords pure 6β-ethoxypregn-4-ene-3,20-dione, M.P. about 162–163°. This substance displays an ultraviolet maximum at about 235 millimicrons with an extinction coefficient of about 13,900.

EXAMPLE 3

To a solution of 15.1 parts of 17β-hydroxy-17α-methylandrost-4-en-3-one in 60 parts of methanol containing 4.4 parts of pyridine is added 22.3 parts of cupric bromide, and the resulting slurry is stirred at room temperature for about 20 hours, then diluted with ethyl acetate. This mixture is washed successively with aqueous sodium bicarbonate and dilute ammonium hydroxide, dried over anhydrous sodium sulfate, and concentrated to dryness. The residue is chromatographed on silica gel, and the column is eluted successively with benzene containing increasing concentrations of ethyl acetate. The 12–25% ethyl acetate in benzene eluates yield a fraction which is crystallized from ethyl acetate-hexane to produce 17β-hydroxy-6β-methoxy-17α-methylandrost-4-en-3-one, M.P. about 149–150°; $[\alpha]_D = +22°$ (chloroform); $[\alpha]_D = +15°$ (methanol). It exhibits maxima in the infrared at about 2.75, 5.92, 6.18, 9.15, and 11.38 microns, and an ultraviolet maximum at about 235 millimicrons with a molecular extinction coefficient of about 13,000.

EXAMPLE 4

A mixture of 5.4 parts of 17α,21-dihydroxypregn-4-ene-3,11,20-trione, 2.7 parts of pyridine, 6.7 parts of cupric bromide, and 80 parts of methanol is stirred at room temperature for about 24 hours. Approximately 100 parts of saturated aqueous sodium bicarbonate and 100 parts of water are added, and the resulting mixture is extracted with ethyl acetate. The organic layer is dried over anhydrous sodium sulfate, then concentrated to dryness, and this residue is chromatographed on silica gel. Elution of the column with 35% ethyl acetate in benzene followed by concentration of the eluate to dryness, and crystallization of the residue first from ethyl acetate, then from acetone results in pure 17α,21-dihydroxy-6β-methoxypregn-4-ene-3,11,20-trione, M.P. about 233–238°; $[\alpha]_D = +132°$ (chloroform). Infrared maxima are observed at about 2.85, 5.83, 6.00, 9.18, and 11.39 microns, and this substance displays also an ultraviolet absorption maximum at about 230.5 millimicrons with a molecular extinction coefficient of about 13,800.

EXAMPLE 5

To a solution of 3.85 parts of cholest-4-en-3-one in 240 parts of methanol is added, at 0°, a solution of 4.47 parts of cupric bromide in 40 parts of methanol. The resulting mixture is stored at 0° for about 5 days, then filtered to remove the crystalline precipitate of 6β-methoxycholest-4-en-3-one. This compound is characterized by infrared maxima at about 5.93, 6.19, 9.17, 9.29, and 11.39 microns, and by an ultraviolet maximum at about 236 millimicrons with a molecular extinction coefficient of about 12,900.

EXAMPLE 6

To a solution of 3.72 parts of 21-acetoxypregn-4-ene-3,20-dione in 160 parts of methanol is added, at 0°, 4.47 parts of cupric bromide, and the resulting solution is kept at 0° for about 2 days. The crystalline precipitate which forms is collected by filtration and dried to yield 21-acetoxy-6β-methoxypregn-4-ene-3,20-dione. It displays maxima in the infrared at about 5.70, 5.78, 5.93, 6.18, 8.02, 9.18 9.32, and 11.38 microns, and also an ultraviolet maximum at about 236.5 millimicrons with a molecular extinction coefficient of about 14,300.

EXAMPLE 7

A solution of 6 parts of 17α-acetoxypregn-4-ene-3,20-dione and 7.17 parts of cupric bromide in 1600 parts of methanol is stored at about 2° for about 3 days. The solution is diluted with about 75 parts of saturated aqueous sodium bicarbonate, then filtered and concentrated to dryness. The resulting residue is extracted with ether, and the ether extract is concentrated to dryness to afford a residue, which is chromatographed on silica gel. The chromatographic column is eluted successively with ethyl acetate-benzene mixtures containing increasing concentrations of ethyl acetate. The 20% ethyl acetate in benzene eluate affords a fraction, which is crystallized successively from aqueous methanol, aqueous acetone, and acetone-hexane to yield 17α-acetoxy-6β-methoxypregn-4-ene-3,20-dione, M.P. 254–255°; $[\alpha]_D = +20°$ (chloroform). It is further characterized by an ultraviolet absorption maximum at about 234.5 millimicrons with a molecular extinction coefficient of about 14,600.

The substitution of an equivalent quantity of cupric chloride for cupric bromide in the herein-described process also results in 17α-acetoxy-6β-methoxypregn-4-ene-3,20-dione.

EXAMPLE 8

To a solution of 3.14 parts of pregn-4-ene-3,20-dione and 1.8 parts of pyridine in 40 parts of methanol is added a methanolic solution containing 4.47 parts of cupric bromide. The resulting green slurry is stirred at room temperature for about 24 hours, then treated with ether and water. The ether layer is separated, washed with water, dried over anhydrous sodium sulfate, and concentrated to dryness. Successive crystallizations of the residue from ether-hexane, methylene chloride-hexane, and ethyl acetate-hexane results in pure 6β-methoxypregn-4-ene-3,20-dione, M.P. about 172–173°; $[\alpha]_D = +127°$ (chloroform). Infrared maxima are observed at about 5.86, 5.93, 6.18, 9.18, and 11.37 microns, and an ultraviolet maximum at about 235 millimicrons with a molecular extinction coefficient of about 13,700.

EXAMPLE 9

To a solution of 2.88 parts of 17β-hydroxyandrost-4-en-3-one in 110 parts of methanol is added, at 0–5°, 4.47 parts of cupric bromide, and the resulting solution is stored at 0–5° for about 7 days, then poured into about 800 parts of water. The resulting crystalline precipitate is collected by filtration, dried, and recrystallized first from ether, then from methanol to yield pure 17β-hydroxy-6β-methoxyandrost-4-en-3-one, M.P. about 213–217°; $[\alpha]_D = +45°$ (chloroform). This substance exhibits infrared maxima at about 2.88, 6.01, 9.18, and 11.34 microns, and also an ultraviolet maximum at about 235 millimicrons with a molecular extinction coefficient of about 13,000.

EXAMPLE 10

A solution of 7.73 parts of 17α-acetoxy-6α-methylpregn-4-ene-3,20-dione and 8.92 parts of cupric bromide in 800 parts of methanol is kept at 2° for about 3 days, then treated with approximately 75 parts of saturated aqueous sodium bicarbonate. The mixture is filtered, and the filtrate is concentrated to dryness to afford a residue which is extracted with ether. This extract is concentrated to a small volume, and the resulting crystals are collected by filtration and dried to yield crude 17α-acetoxy-6β-methoxy-6α-methylpregn-4-ene-3,20-dione, M.P. about 201–206°. Recrystallization first from methanol, then from acetone-hexane results in the pure compound, M.P. 210–215°; $[\alpha]_D = +7.5°$ (chloroform). It displays infrared maxima at about 3.52, 5.76, 5.97, 6.22, 7.89, 7.95, 9.27, 10.39, and 11.41 microns, and an ultraviolet maximum at about 235.5 millimicrons with an extinction coefficient of about 13,500.

The substitution of equivalent quantities of 6α-methyl-17α-propionoxypregn-4-ene-3,20-dione and ethanol in the process of this example results in 6β-ethoxy-6α-methyl-17α-propionoxypregn-4-ene-3,20-dione.

EXAMPLE 11

To a solution of 1.8 parts of pyridine in 32 parts of methanol is added 3.26 parts of 17α-ethynyl-17β-hydroxy-6α-methylandrost-4-en-3-one and 4.47 parts of cupric bromide, and the resulting slurry is stirred at room temperature for about 16 hours, then poured into saturated aqueous sodium bicarbonate. This aqueous mixture is extracted with ethyl acetate, and the extract is concentrated to an oil, which is then chromatographed on silica gel. The column is eluted first with 5% ethyl acetate in benzene, then with 10% ethyl acetate in benezene. The latter eluate affords a fraction which is crystallized first from aqueous methanol, then from acetone-hexane to yield 17α-ethynyl-17β-hydroxy-6β-methoxy-6α-methylandrost-4-en-3-one, M.P. about 216.5–220–5°

$$[\alpha]_D = -23.3°$$

(chloroform). In the infrared, it exhibits maxima at about 2.76, 3.02, 5.98, 6.23, 9.29, and 11.41 microns; in the ultraviolet, at about 235.5 millimicrons with a molecular extinction coefficient of about 11,400.

By substituting equivalent quantities of 17β-hydroxy-6α-methyl-17α-propynylandrost-4-en-3-one and ethanol in the instant process, 6β-ethoxy-17β-hydroxy-6α-methyl-17α-propynylandrost-4-en-3-one is obtained.

EXAMPLE 12

Method A

A solution of 28.8 parts of 17β-hydroxyandrost-4-en-3-one and 89.3 parts of cupric bromide in 480 parts of methanol is allowed to stand at room temperature for about 3 days, then poured into an aqueous solution prepared by dissolving 40 parts of sodium bicarbonate in 1000 parts of water. The plastic mass which precipitates is separated by decantation, washed with water, and extracted with ethyl acetate. The organic extract is washed with water, dried over anhydrous sodium sulfate, and concentrated to dryness. Crystallization of the residue from ethyl acetate affords 17β-hydroxy-6-methoxyandrosta-4,6-dien-3-one, M.P. about 165–167°.

Method B

The procedure of Method A is conducted in the same manner as described therein, except that the reaction mixture is stored at 0–5° for about 3 days. In this instance the ethyl acetate extract of the precipitated crude product is concentrated to afford a solid residue, which is washed with ether, then recrystallized from ethyl acetate to produce 17β - hydroxy - 6-methoxyandrosta-4,6-dien-3-one, identical with the product of Method A.

EXAMPLE 13

The substitution of an equivalent quantity of 17α-acetoxypregn-4-ene-3,20-dione in either of the procedures, preferably procedure B, of Example 12 results in 17α-acetoxy - 6 - methoxypregna-4,6-diene-3,20-dione, M.P. about 201–204°. It displays ultraviolet maxima at about 247.5 and 303.5 millimicrons with molecular extinction coefficients of about 8000 and 15,500, respectively.

EXAMPLE 14

A mixture of one part of 17β-hydroxy-6-methoxyandrosta-4,6-dien-3-one, 10 parts of pyridine, and 10 parts of acetic anhydride is allowed to stand at room temperature for about 4 hours, then poured slowly into 300 parts of cold water. The precipitate which forms is collected by filtration, dried, and recrystallized first from hexane then from acetone-hexane to afford 17β-acetoxy-6-methoxyandrosta-4,6-dien-3-one, M.P. about 161–162°

$$[\alpha]_D = +3°$$

(chloroform). This substance is further characterized by ultraviolet maxima at about 248.5 and 303 millimicrons with extinction coefficients of about 7,900 and 15,400, respectively.

EXAMPLE 15

To a solution containing 30 parts of water and 12 parts of concentrated hydrochloric acid in 150 parts of dioxane is added 1.3 parts of 17β-acetoxy-6-methoxyandrosta-4,6-dien-3-one, and this reaction mixture is stored at room temperature for about 16 hours. Dilution with about 1000 parts of water results in precipitation of the product, which is collected by filtration, dried, and recrystallized succesively from acetone-hexane and aqueous methanol to yield 17β-acetoxyandrost-4-ene-3,6-dione, M.P. about 212–214°. It displays a maximum in the ultraviolet at about 249.5 millimicrons with an extinction coefficient of about 11,000.

By substituting an equivalent quantity of 17β-hydroxy-6-methoxyandrosta-4,6-dien-3-one or 17α - acetoxy-6-methoxypregna-4,6-diene-3,20-dione in the process of this example. 17β-hydroxyandrost-4-ene-3,6-dione and 17α-acetoxypregn-4-ene-3,6,20-trione are obtained.

EXAMPLE 16

The substitution of equivalent quantities of androst-4-ene-3,17-dione, pregn-4-ene-3,20-dione, 17β-hydroxy-17α-methylandrost-4-en-3-one, cholest-4-en-3-one, or 21-acetoxypregn-4-ene-3,20-dione in Method B of Example 12 results in 6-methoxyandrosta-4,6-diene-3,17-dione, 6-methoxypregna - 4,6 - diene - 3,20 - dione, 17β-hydroxy-6-methoxy-17α-methylandrosta-4,6-dien-3-one, 6-methoxycholesta-4,6-dien-3-one, and 21-acetoxy-6-methoxypregna-4,6-diene-3,20-dione, respectively.

EXAMPLE 17

The substitution of an equivalent quantity of ethanol for methanol in the process of Example 13 results in 17α-acetoxy-6-ethoxypregna-4,6-diene-3,20-dione.

EXAMPLE 18

To a solution of 36 parts of concentrated hydrochloric acid in 250 parts of dioxane containing 70 parts of water is added 1.53 parts of 17β-hydroxy-6β-methoxyandrost-4-en-3-one, and the mixture is heated at reflux for about 4 hours, then cooled and diluted with about 1500 parts of water. Concentration in vacuo to a small volume results in crystallization of 17β-hydroxy-5α-androstane-3,6-dione, M.P. about 218–221°.

A solution of this 3,6-dione in 10 parts of acetic anhydride and 10 parts of pyridine is allowed to stand at room temperature for about 15 hours, then is diluted with water. The resulting precipitate is collected by filtration, and recrystallized from acetone-hexane to afford 17β-acetoxy-5α-androstane-3,17-dione, which displays a double melting point at about 174–179° and 188–190°.

By substituting equivalent quantities of 6β-methoxypregn-4-ene-3,20-dione, 6β-methoxycholest-4-en-3-one, or 21-hydroxy-6β-methoxypregn-4-ene-3,20 - dione in the process of this example; 5α-pregnane-3,6,20-trione, M.P. about 235–238°, ($[\alpha]_D = +60°$), cholestane-3,6-dione, M.P. about 176–177°, and 21-hydroxy-5α-pregnane-3,6,20-trione, M.P. about 217–220°, are obtained.

What is claimed is:

1. A process for the manufacture of compounds of the structural formula

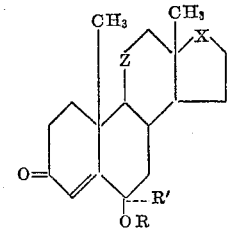

wherein R is a lower alkyl radical, R' is selected from the group consisting of hydrogen and methyl radicals, Z is selected from the group consisting of methylene, hydroxymethylene and carbonyl radicals, and X is a member of the class consisting of carbonyl,

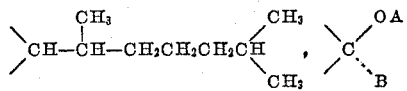

and

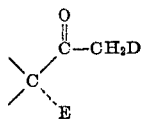

radicals, in which groups A is a member of the class consisting of hydrogen and lower alkanoyl radicals, B is selected from the group consisting of hydrogen, lower alkyl, and lower alkynyl radicals, and D and E are selected from the group consisting of hydrogen, hydroxy, and lower alkanoyloxy radicals; which consists of treating a compound of the structural formula

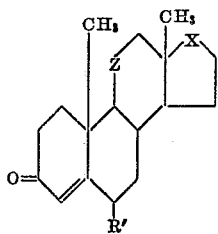

with a lower alkanol in the presence of not greater than 2 molecular equivalents of a cupric halide selected from the class consisting of cupric bromide and cupric chloride.

2. The process of claim 1, conducted in the presence of an acid acceptor.

3. A compound of the structural formula

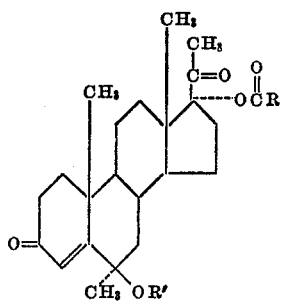

wherein R and R' are lower alkyl radicals.

4. 17α-acetoxy - 6β - methoxy - 6α - methylpregn-4-ene-3,20-dione.

5. A compound of the structural formula

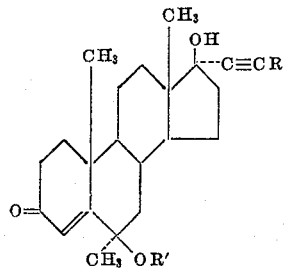

wherein R is selected from the group consisting of hydrogen and lower alkyl radicals, and R' is a lower alkyl radical.

6. 17α - ethynyl-17β-hydroxy-6β-methoxy-6α-methylandrost-4-en-3-one.

7. In a process for the manufacture of compounds of the structural formula

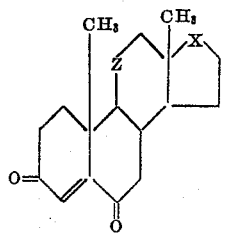

wherein X and Z are as defined in claim 1, the step which comprises treating a compound of the structural formula

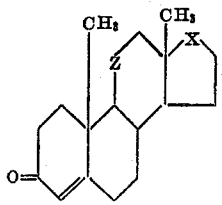

with a lower alkanol in the presence of greater than 2 molecular equivalents of a cupric halide selected from the class consisting of cupric bromide and cupric chloride.

8. 17β-hydroxy-6-methoxyandrosta-4,6-dien-3-one.
9. 17α-acetoxy-6-methoxypregna-4,6-diene-3,20-dione.

No references cited.